US010915935B2

(12) United States Patent
Kalin et al.

(10) Patent No.: US 10,915,935 B2
(45) Date of Patent: Feb. 9, 2021

(54) METHOD AND APPARATUS FOR REQUESTING PRODUCTS

(71) Applicant: Etsy, Inc., Brooklyn, NY (US)

(72) Inventors: Robert Kalin, Brooklyn, NY (US); Christopher Maguire, Philadelphia, PA (US); Haim Schoppik, Jersey City, NJ (US); Jared Tarbell, Albuquerque, NM (US)

(73) Assignee: Etsy, Inc., Brooklyn, NY (US)

( * ) Notice: Subject to any disclaimer, the term of this patent is extended or adjusted under 35 U.S.C. 154(b) by 317 days.

(21) Appl. No.: 16/144,640

(22) Filed: Sep. 27, 2018

(65) Prior Publication Data

US 2019/0026800 A1 Jan. 24, 2019

Related U.S. Application Data

(63) Continuation of application No. 12/017,501, filed on Jan. 22, 2008, now abandoned.
(Continued)

(51) Int. Cl.
*G06Q 30/00* (2012.01)
*G06Q 30/06* (2012.01)

(52) U.S. Cl.
CPC ......... *G06Q 30/06* (2013.01); *G06Q 30/0611* (2013.01); *G06Q 30/0621* (2013.01); *G06Q 30/0643* (2013.01)

(58) Field of Classification Search
CPC .............................................. G06Q 30/06–08
(Continued)

(56) References Cited

U.S. PATENT DOCUMENTS 6,496,851 B1 12/2002 Morris et al.
7,725,365 B2 5/2010 Westberg
(Continued)

FOREIGN PATENT DOCUMENTS

KR 1020010106868 12/2001
KR 1020020015222 2/2002
WO 0180133 10/2001

OTHER PUBLICATIONS

Patent Examination Report dated Dec. 4, 2014, for European Patent Office Application No. 08728038.4 (5 pages).
(Continued)

*Primary Examiner* — Ethan D Civan
(74) *Attorney, Agent, or Firm* — Fish & Richardson P.C.

(57) ABSTRACT

A system and method for selling product is provided. In accordance with one aspect, shoppers using an Internet-based commerce site may request custom designed products rather than mass produced products from willing sellers. Shoppers may provide terms under which the custom good must be manufactured. Various systems and methods may also provide a platform for shoppers and sellers to negotiate terms and/or to incorporate negotiated terms into such requests. According to some embodiments, the system and method for selling product facilitates fabrication, delivery and payment for customized goods. In one embodiment, requests for customized goods may be fulfilled by multiple sellers. One example includes multiple sellers fulfilling a custom request, and another includes multiple sellers each producing a part of a desired quantity for a custom request, among other options. One aspect also includes allowing shoppers to request custom made products from one or more manufacturers. One aspect includes placing a public request for bids to manufacture a custom product and accepting offers from manufacturers to fulfill the bids.

20 Claims, 14 Drawing Sheets

Related U.S. Application Data

(60) Provisional application No. 60/881,790, filed on Jan. 19, 2007.

(58) Field of Classification Search
USPC .............................................. 705/26.1–27.2
See application file for complete search history.

(56) References Cited

U.S. PATENT DOCUMENTS

| | | |
|---|---|---|
| 7,884,953 B1 | 2/2011 | Willcocks et al. |
| 7,899,721 B2 | 3/2011 | Bowman-Amuah |
| 8,108,260 B2 | 1/2012 | Maguire et al. |
| 2001/0051904 A1 | 12/2001 | Nishimura |
| 2002/0090240 A1 | 7/2002 | Lively |
| 2003/0004850 A1 | 1/2003 | Li et al. |
| 2003/0012454 A1 | 1/2003 | Manico et al. |
| 2003/0083982 A1 | 5/2003 | Fisher et al. |
| 2003/0109949 A1 | 6/2003 | Ikeda et al. |
| 2003/0208718 A1 | 11/2003 | Mulvey et al. |
| 2004/0188012 A1 | 9/2004 | Westberg |
| 2005/0177468 A1 | 8/2005 | Lam et al. |
| 2005/0240507 A1* | 10/2005 | Galen ............... G06Q 30/08 705/37 |
| 2005/0246240 A1 | 11/2005 | Padilla |
| 2005/0289042 A1 | 12/2005 | Friesen |
| 2006/0052891 A1 | 3/2006 | Ikeda et al. |

OTHER PUBLICATIONS

Patent Examination Report No. 2 dated Sep. 13, 2012, for Australian Patent Application No. 2008206061, 3 pages.

* cited by examiner

| Title | Ideal Price | Posted On | Deadline | Bids | Requested By |
|---|---|---|---|---|---|
| Etsy Long Sleeve Tee & Baseball Hat | $15.00 | Jan 21 | Feb 15 | 3 bids | ☐ BeadedImagery |
| Etsy Long Sleeve Tee & Baseball Hat | $15.00 | Jan 21 | Feb 15 | 3 bids | ☐ BeadedImagery |
| Etsy Long Sleeve Tee & Baseball Hat | $15.00 | Jan 21 | Feb 15 | 3 bids | ☐ BeadedImagery |
| Etsy Long Sleeve Tee & Baseball Hat with a longer title | $15.00 | Jan 21 | Feb 15 | 3 bids | ☐ BeadedImagery |
| Etsy Long Sleeve Tee & Baseball Hat | $15.00 | Jan 21 | Feb 15 | 3 bids | ☐ BeadedImagery |
| Etsy Long Sleeve Tee & Baseball Hat | $15.00 | Jan 21 | Feb 15 | 3 bids | ☐ BeadedImagery |
| Etsy Long Sleeve Tee & Baseball Hat | $15.00 | Jan 21 | Feb 15 | 3 bids | ☐ BeadedImagery |
| Etsy Long Sleeve Tee & Baseball Hat with a longer title | $15.00 | Jan 21 | Feb 15 | 3 bids | ☐ BeadedImagery |
| Etsy Long Sleeve Tee & Baseball Hat | $15.00 | Jan 21 | Feb 15 | 3 bids | ☐ BeadedImagery |

Total Bids: 3
Bids Accepted: 0
You placed the bid on 4/11/06:

Bid #1 placed by Rokali on April 11, 2006:

How much will it cost to make?
$25.00 (Ideal price @ $20.00)

Estimated shipping cost:
$5.00

When can you finish the item by?
July 18, 2006 (Ideal date is July 10, 2006)

Describe exactly what you will make, providing as much detail as possible.
I have friends with a little girl nicknamed "The Squid" and they are about to have another little girl called "The Prawn". I would like something that incorporates a squid and a prawn. I have no particular materials in mind, so I will consider all media. Squid also likes trucks but that doesn't need to be included.

How would you ship the item?
I'll strap it to a goose and pad it with down.

Preferred payment method:
PayPal

Terms of payment (due up front, after item has been received, etc.)
Bah bah my terms black sheep.

Questions about the item? Contact Sellername via conversations)
Need to make changes to this? Click here to edit your bid.
Last edited by Rokali on 4/12/06

901 — status: bid not yet accepted
902 — status: bid accepted! You now need to confirm your bid
903 — status: bid accepted and confirmed, click here to view details, add images About Etsy | Press | Terms of Use | Privacy Policy

*FIG. 9*

Total Bids: 3
Bids Accepted: 0
You placed the bid on 4/11/06:

Bid #1 placed by Rokali on April 11, 2006:
How much will it cost to make?
$ [25.00] (Ideal price @ $20.00) —— 1004

Estimated shipping cost:
$ [5.00] —— 1006

When can you finish the item by?
[July ▽] [18 ▽] [2006 ▽]  (Ideal date is July 18, 2006)
1008

Describe exactly what you will make, providing as much detail as possible.
1010
(show stored data for this and all other fields)

How would you ship the item?
1012

Preferred payment method:
1014 [▽]

Terms of payment (due up front, after item has been received, etc.)
1016

1002 [Save Changes]

Your changes will be seen by $Listername immediately.

*FIG. 10*

Total Bids: 3
Bids Accepted: 0

Bid #1 placed by Rokoli on April 11, 2006:

How much will it cost to make?
$25.00 (Ideal price @ $20.00)

Estimated shipping cost:
$5.00 view profile
view shop
contact

When can you finish the item by?
July 18, 2006 (Ideal date is July 18, 2006)

Describe exactly what you will make, providing as much detail as possible.

I have friends with a little girl nicknamed "The Squid" and they are about to have another little girl called "The Prawn". I would like something that incorporates a squid and a prawn. I have no particular materials in mind, so I will consider all media. Squid also likes trucks but that doesn't need to be included.

How would you ship the item?
I'll strap it to a goose and pod it with down.

Preferred payment method:
PayPal

Terms of payment (due up front, after item has been received, etc.)
Bah bah my terms block sheep.

Questions about the item? Contact Rokoli via conversations)

[ Accept Bid ]   *this bid will expire on April 31, 2006
                 *if you accept it; the bidder will need to confirm

1102

Bid #2 placed by RevolvingDork on April 11, 2006:

How much will it cost to make?

Home > Alchemy

◇ Alchemy

*How Alchemy Works
*Your Listings

Bid(s) you accepted for $ListingTitle
view your listing

Total Bids: 3
Bids Accepted: 2 ——1202

Bid #1 placed by Rokali on April 11, 2006 / You accepted it on April 12, 2006
cost: $25.00 + $5.00 shipping, item completed by July 18, 2006 / view complete bid Status update from Seller:
I have finished the item and posted pictures. Please send the remaining 50% due and I'll ship it.

Images of the item from seller:

view profile
view shop
contact

Payment:
You agreed to pay 50% up front and 50% when the item is done.
Total amount due: $50.00 click here to view your invoice and pay 1204 — Bid #7 placed by RevolvingDork on April 11, 2006 / You accepted it on April 12, 2006
cost: $25.00 + $5.00 shipping, item completed by July 18, 2006 / view complete bid Status update from Seller:
The seller has not yet confirmed their bid. They need to do this.

Images of the item from seller:
(no images submitted)

view profile
view shop
contact

Payment:
No payment is due until the seller confirms their bid.

Listing Title goes here cost: $25.00 + $5.00 shipping, item completed by July 18, 2006 / view complete listing
by ListerName profile & contact

Bid #1 placed by Rokali on April 11, 2006 / You accepted it on April 12, 2006 cost: $25.00 + $5.00 shipping, item completed by July 18, 2006 / view complete bid Status update (seen by $Listername):

I have finished the item and posted pictures. Please send the remaining 50% due and I'll ship it.

[Save]

Images of the item (you can have up to 5 total):

remove   remove   remove

You can add 2 more images (make sure to click the Upload button):

[Browse]
[Browse]

[Upload]

Payment:

Your terms: 50% up front and 50% when the item is done (before it's shipped)
Total amount you're owed for this item: $50.00
$25.00 up front/paid
$25.00 upon completion/click here to send an invoice to $Listername

METHOD AND APPARATUS FOR REQUESTING PRODUCTS

RELATED APPLICATIONS

This application is a continuation of U.S. patent application Ser. No. 12/017,501, entitled "METHOD AND APPARATUS FOR REQUESTING PRODUCTS," filed on Jan. 22, 2008, which claims priority under 35 U.S.C. § 119(e) to U.S. Provisional Application Ser. No. 60/881,790, entitled "METHOD AND APPARATUS FOR REQUESTING PRODUCTS," filed on Jan. 19, 2007, both of which are incorporated herein by reference in their entirety.

BACKGROUND

1. Field of Invention

The instant invention relates to Internet-based commerce and more particularly to transactions involving custom products.

2. Discussion of Related Art

Internet-based commerce is a major industry world-wide. Typical Internet-based commerce websites present a shopper with a wide variety of products for purchase when the shopper visits the websites (e.g., using a standard web browser). Through a webpage interface, the shopper may choose desired products from among the wide variety of presented products. The shopper may purchase chosen products, for example, by using a standard credit card authorization interface. The chosen products may then be shipped to the shopper or some other address provided by the shopper through the website interface.

Some Internet-based commerce sites are linked to a specific manufacturer or type of product and allow shoppers to choose from only a limited array of products from that manufacturer or that type. Others are more general sites that allow shoppers to select from a wide array of product types from a wide array of manufacturers. While some of these Internet-based commerce sites provide shoppers with a department store-like shopping experience where the sites present the shopper with the products of only large sellers or manufacturers, others provide shoppers with a more market-like shopping experience where the site presents the shopper with products from smaller or individual sellers or manufacturers. In any case, shoppers at Internet-based commerce sites are typically presented with a vast number of products of different types, colors, origins, etc. from which to choose.

The vast number of Internet-based commerce sites in existence today allows consumers access to a huge array of products. These products are traditionally manufactured by a corporation or individual and offered for sale, either by that corporation or individual or some other entity, through one of the vast number of Internet-based commerce sites.

SUMMARY

In accordance with one aspect of the instant invention, it is realized that shoppers using an Internet-based commerce site may desire custom designed products rather than mass produced products. One aspect of the instant invention includes allowing shoppers to request custom made products from one or more manufacturers. One aspect of the instant invention includes placing a public request for bids to manufacture a custom product and accepting offers from manufacturers to fulfill the bids.

According to one aspect of the present invention, a method of selling a product is provided. The method comprises acts of A) receiving at least one first representation of the product from a shopper, and B) receiving at least one second representation of a first bid to supply the product from a first seller. According to one embodiment of the present invention, the at least one first representation of the product includes at least one of a product description, a product tag, a product material, a product image, a product quantity, an ideal product price, a product price limit, and a product deadline. According to another embodiment of the invention, the at least one second representation of the first bid includes at least one of a first bid description, a first bid price, a first bid quantity, a first bid image, and a first bid supply date. According to another embodiment of the invention, the shopper transmits the at least one first representation of the product through a user interface. According to another embodiment of the invention, the user interface includes at least one webpage.

According to one embodiment of the present invention, the product includes at least one custom designed product. According to another embodiment of the invention, the custom designed product includes at least one handmade product. According to another embodiment of the invention, the first bid includes at least one indication of the first seller's intent to manufacture and deliver the product. According to another embodiment of the invention, the method further comprises an act of C) transmitting at least one third representation of the product to the first seller. According to another embodiment of the invention, the third representation includes at least a portion of the first representation. According to another embodiment of the invention, the method further comprises an act of D) displaying the third representation of the product to the first seller through a user interface. According to another embodiment of the invention, the user interface includes at least one webpage. According to another embodiment of the invention, the first seller transmits the at least one second representation of the first bid through the user interface.

According to one embodiment of the present invention, the method further comprises an act of C) transmitting at least one third representation of the first bid to the shopper. According to another embodiment of the invention, the third representation includes at least a portion of the second representation. According to another embodiment of the invention, the method further comprises an act of D) displaying the third representation of the first bid to the shopper through a user interface. According to another embodiment of the invention, the user interface includes at least one webpage. According to another embodiment of the invention, the method further comprises an act of C) receiving at least one third representation of an acceptance of the first bid from the shopper. According to another embodiment of the invention, the shopper transmits the third representation of the acceptance through a user interface. According to another embodiment of the invention, the user interface includes at least one web page. According to another embodiment of the invention, the method further comprises an act of D) verifying the first bid with the seller.

According to one aspect of the present invention, the act D includes displaying at least one fourth representation of the acceptance through a user interface. According to another embodiment of the invention, the fourth representation includes at least a portion of the third representation. According to another embodiment of the invention, the act D includes receiving at least one verification of the first bid from the first seller. According to another embodiment of the invention, the method further comprises an act of C) receiving at least one third representation of at least one second bid to supply the product from at least one second seller. According to another embodiment of the invention, the method further comprises an act of D) transmitting at least one fourth representation of the first bid and at least one fifth representation of the second bid to the shopper. According to another embodiment of the invention, the method further comprises an act of E) displaying the fourth representation and the fifth representation to the shopper through a user interface. According to another embodiment of the invention, the user interface includes at least one web page.

According to one aspect of the present invention, a system for selling a product is provided. The system comprises a product submission component configured to accept submission of at least one request for the product from a shopper, and a bid component configured to accept submission of at least one first representation of at least one bid from at least one seller. According to one embodiment of the present invention, the at least one request for the product includes at least one of a product description, a product tag, a product material, a product image, a product quantity, an ideal product price, a product price limit, and a product deadline. According to another embodiment of the invention, the at least one first representation of the bid includes at least one of a bid description, a bid price, a bid quantity, a bid image, and a bid supply date. According to another embodiment of the invention, the submission component is further configured to display at least one user interface through which the shopper submits the request for the product. According to another embodiment of the invention, the user interface includes at least one webpage. According to another embodiment of the invention, the product includes at least one custom designed product.

According to one embodiment of the present invention, the custom designed product includes at least one handmade product. According to another embodiment of the invention, the bid includes at least one indication of the seller's intent to manufacture and deliver the product. According to another embodiment of the invention, the bid component is further configured to transmit at least one second representation of the product to the seller. According to another embodiment of the invention, the second representation includes at least a portion of the request for the product. According to another embodiment of the invention, the bid component is further configured to display the second representation of the product to the seller through a user interface. According to another embodiment of the invention, the user interface includes at least one webpage. According to another embodiment of the invention, the seller submits the at least one first representation of the bid through the user interface. According to another embodiment of the invention, the bid component is further configured to transmit at least one second representation of the bid to the shopper.

According to one embodiment of the present invention, the second representation includes at least a portion of the first representation. According to another embodiment of the invention, the bid component is further configured to display the second representation of the bid to the shopper through a user interface. According to another embodiment of the invention, the user interface includes at least one webpage. According to another embodiment of the invention, the bid component is further configured to receive at least one second representation of an acceptance of the bid from the shopper. According to another embodiment of the invention, the bid component is further configured to display at least one third representation of the bid to the shopper through a user interface and the shopper transmits the second representation of the acceptance through the user interface. According to another embodiment of the invention, the user interface includes at least one web page. According to another embodiment of the invention, the bid component is further configured to verify the bid with the seller. According to another embodiment of the invention, verifying the bid with the seller includes displaying at least one third representation of the acceptance to the seller through a user interface. According to another embodiment of the invention, verifying the bid with the seller includes receiving at least one verification of the bid from the seller.

According to one embodiment of the present invention, the at least one second representation includes a plurality of second representations, the at least one bid includes a plurality of bids and the at least one seller includes a plurality of sellers. According to another embodiment of the invention, the system further comprises a database component configured to store at least one first portion of the at least one request for the product and at least one second portion of the first representation.

According to one aspect of the present invention, a method of selling a plurality of products is provided. The method comprises acts of transmitting at least one first representation of the plurality of products to at least one seller, and receiving at least one second representation of at least one bid to supply at least one first product of the plurality of products from the at least one seller. According to one embodiment of the present invention, the at least one first representation of the plurality of products includes at least one of a product description, a product tag, a product material, a product image, a product quantity, an ideal product price, a product price limit, and a product deadline for each product of the plurality of products. According to another embodiment of the invention, the at least one second representation of the bid includes at least one of a bid description, a bid price, a bid quantity, a bid image, and a bid supply date. According to another embodiment of the invention, the method further comprises an act of C) displaying the at least one first representation through a user interface. According to another embodiment of the invention, the user interface includes at least one webpage. According to another embodiment of the invention, the seller transmits the at least one second representation of the bid through the user interface.

According to one embodiment of the present invention, the plurality of products includes at least one custom designed product. According to another embodiment of the invention, the custom designed product includes at least one handmade product. According to another embodiment of the invention, the bid includes at least one indication of the seller's intent to manufacture and deliver the first product. According to another embodiment of the invention, the at least one seller includes a plurality of sellers, the at least one bid includes a plurality of bids, and the at least one second representation includes a plurality of second representations. According to another embodiment of the invention, the method further comprises an act of C) transmitting at least one third representation of the bid to at least one shopper associated with the first product. According to another embodiment of the invention, the third representation includes at least a portion of the second representation. According to another embodiment of the invention, the method further comprises an act of D) receiving at least one fourth representation of an acceptance of the bid from the shopper.

According to one aspect of the present invention, a system for selling a plurality of products is provided. The system comprises a bid component configured to display a plurality of requests for a plurality of products and to accept at least one first representation of at least one bid to supply a first product of the plurality of products from at least one seller. According to one embodiment of the present invention, the plurality of requests includes at least one of a product description, a product tag, a product material, a product image, a product quantity, an ideal product price, a product price limit, and a product deadline for each product of the plurality of products. According to another embodiment of the invention, the at least one first representation of the bid includes at least one of a bid description, a bid price, a bid quantity, a bid image, and a bid supply date. According to another embodiment of the invention, the bid component is configured to display the plurality of requests through a user interface. According to another embodiment of the invention, the user interface includes at least one webpage. According to another embodiment of the invention, the seller transmits the at least one representation of the bid through the user interface. According to another embodiment of the invention, the plurality of products includes at least one custom designed product. According to another embodiment of the invention, the custom designed product includes at least one handmade product. According to another embodiment of the invention, the bid includes at least one indication of the seller's intent to manufacture and deliver the first product.

According to one embodiment of the present invention, the at least one seller includes a plurality of sellers, the at least one bid includes a plurality of bids, and the at least one first presentation representation includes a plurality of first representations.

According to another embodiment of the invention, the bid component is further configured to transmit at least one second representation of the bid to at least one shopper associated with the first product. According to another embodiment of the invention, the second representation includes at least a portion of the first representation. According to another embodiment of the invention, the bid component is configured to accept at least one third representation of an acceptance of the bid from the shopper.

Further features and advantages of the instant invention as well as the structure and operation of various embodiments of the instant invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF DRAWINGS

The accompanying drawings are not intended to be drawn to scale. In the drawings, each identical or nearly identical component that is shown in various figures is represented by a like numeral. For purposes of clarity, not every component may be labeled in every drawing. In the drawings:

FIG. 6 shows an example request browsing interface according to one embodiment of the instant invention;

FIG. 8 shows an example bid submission interface according to one embodiment of the instant invention;

FIG. 9 shows an example bid status interface according to one embodiment of the instant invention;

FIG. 10 shows an example bid editing interface according to one embodiment of the instant invention;

FIG. 11 shows an example bid selection interface according to one embodiment of the instant invention;

FIG. 12 shows an example status interface according to one embodiment of the instant invention;

FIG. 13 shows an example progress update interface according to one embodiment of the instant invention.

DETAILED DESCRIPTION

Figure 1:
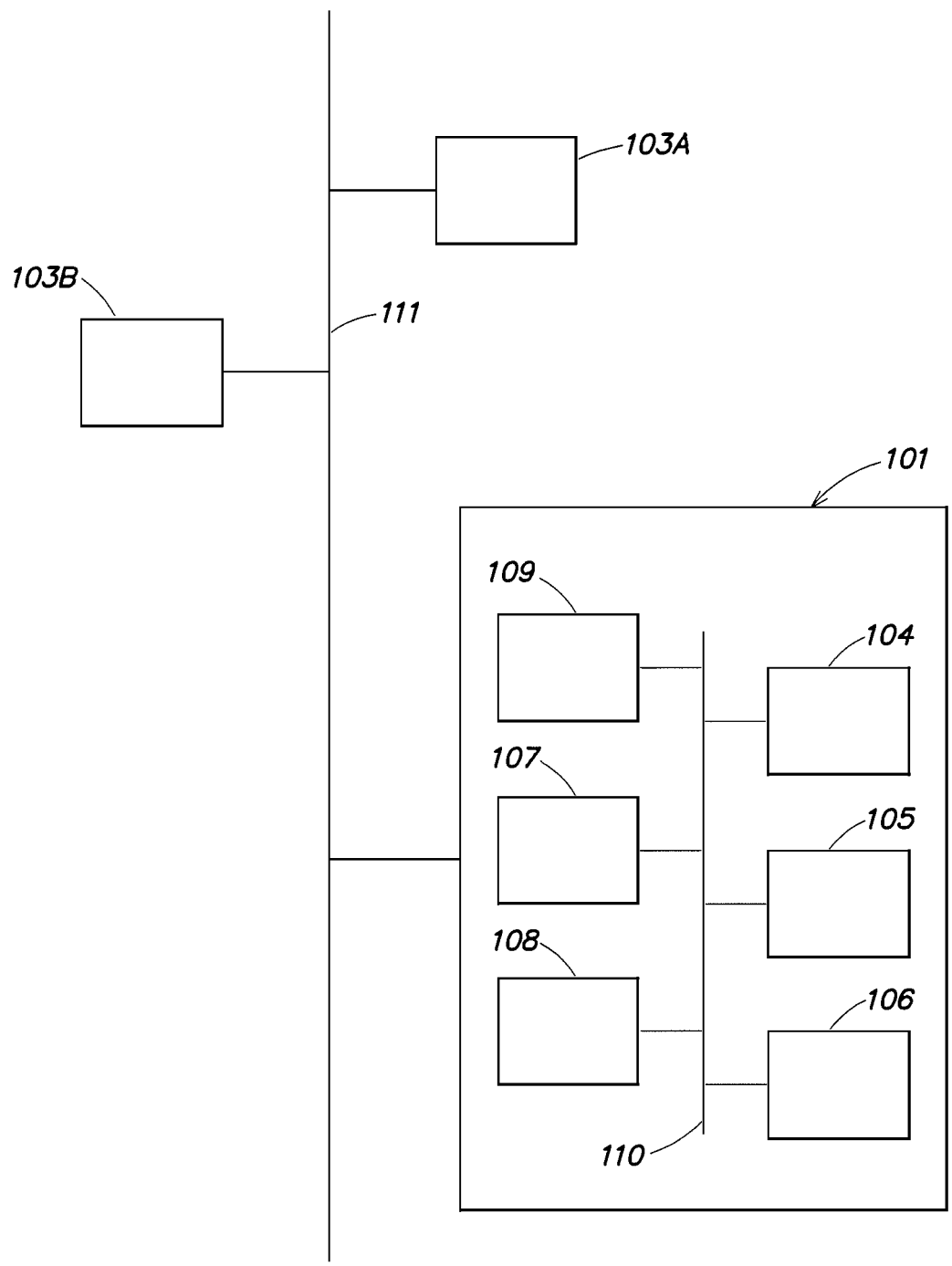
FIG. 1 shows a block diagram of a general purpose computer and network system in which various aspects of the instant invention may be practiced.

The instant invention is not limited in its application to the details of construction and the arrangement of components set forth in the following description or shown in the drawings. The instant invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The term shopper used herein should be understood to include any user of an internet based commerce site. For example, a shopper may include any user of an Internet based commerce site that submits a request for the creation of a custom fabricated product.

The instant invention relates generally to transaction related to custom made products through an Internet-based commerce website by submitting requests for such products to the Internet-based commerce site. In some implementations, the custom made products may include handmade products made by one or more sellers using the Internet-based commerce site. By allowing shoppers to request custom made products and suppliers to provide those custom made products to the shoppers, shoppers may experience an enhanced shopping experience and be able to purchase products they may want but may be otherwise unable to find.

In one embodiment, an Internet-based commerce site may accept requests from shoppers for custom made products. The Internet-based commerce site may allow suppliers to browse or search such submitted requests and place bids on supplying the requested custom made products to the shoppers. In some implementations, the custom made products may include hand made products fabricated by the sellers.

In some embodiments, once a bid is placed, a seller and a shopper may enter into a conversation regarding the creation of the custom product and the details of the deal to supply the custom product. In some embodiments, the conversation may occur through the Internet-based commerce site.

In some embodiments, after receiving an acceptable bid, a shopper may accept a bid. In some embodiments, the seller may be notified and a final deal may be made between the shopper and seller according to detail discussed through their conversation. The seller may then fabricate the custom product and supply the shopper with the final custom product.

In one embodiment, the Internet-based commerce website may collect a fee associated with a custom made product related transaction. For example, in some implementations, the Internet-based commerce website may take a percentage of the fee paid from the shopper to the seller for creation of the custom product. In some implementations, the shopper may make payment to the bidder through the internet-based commerce site. The Internet-based commerce site may then provide the payment to the seller, and in some implementations, withhold a fee portion of the payment. In some other implementations, the shopper may provide payment to the seller not through the Internet-based commerce site and the seller may provide the fee to the Internet-based commerce site separately.

General Purpose Computer System

Various aspects of the instant invention may be implemented on one or more computer systems. These computer systems may include, for example, general-purpose computers such as those based on Intel PENTIUM or Core-type processor; Motorola PowerPC; AMD Athlon, Turion or Opteron; Sun UltraSPARC; Hewlett-Packard PA-RISC processors; or any other type of processor. The system may be located on a single computer or may be distributed among multiple computers attached by a communication network.

A general-purpose computer system according to one embodiment of the invention may be configured to perform any functions, including but not limited to, storing information, editing information, categorizing items, retrieving information, and transmitting information. It should be appreciated that the system may perform other functions, including other acts of managing information, sharing information, formatting information, communicating with banks and/or credit card providers, etc., and the invention is not limited to having any particular function or set of functions.

FIG. 1 shows a block diagram of a general purpose computer and network system in which various aspects of the instant invention may be practiced. For example, various aspects of the invention may be implemented as specialized software executing in one or more computer systems including general-purpose computer system 101 shown in FIG. 1. Computer system 101 may include a general-purpose computer system that is programmable using a high-level computer programming language. Computer system 101 may be also implemented using specially programmed, special purpose hardware. In computer system 101, one or more processors 104 are typically a commercially available processor such as the well-known Pentium or Core class processor available from the Intel Corporation or the well-known Athlon, Turion or Opteron class processor available from AMD Corporation. Many other processors are available. Such a processor usually executes an operating system which may include, for example, the Windows-based operating systems (e.g., Windows NT, Windows 2000 (Windows ME), Windows XP, Windows Vista operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Further, it should be appreciated that other appropriate programming languages and other appropriate computer systems could also be used.

Various embodiments of the instant invention may be programmed using an object-oriented programming language, such as SmallTalk, Java, C++, Ada, Python, or C# (C-Sharp). Other object-oriented programming languages may also be used. Various embodiments of the instant invention may be programmed using one or more scripting languages such as JavaScript and AdobeScript, which may be used in combination with Flash animation. Alternatively or additionally, functional, and/or logical programming languages may be used. Various aspects of the invention may be implemented in a non-programmed environment (e.g., documents created in HTML, XML or other format that, when viewed in a window of a browser program, render aspects of a GUI or perform other functions). Various aspects of the invention may be implemented as programmed or non-programmed elements, or any combination thereof.

Computer system 101 may also include one or more memory devices 105, such as a disk drive, memory, or other device for storing data, connected to the processor 104. Memory 105 is typically used for storing programs and data during operation of the computer system 101. Components of computer system 101 may be coupled by an interconnection mechanism such as network 110, which may include one or more busses (e.g., between components that are integrated within a same machine) and/or a network (e.g., between components that reside on separate discrete machines). The interconnection mechanism enables communications (e.g., data, instructions) to be exchanged between system components of computer system 101.

Computer system 101 may also include one or more input/output (I/O) devices, for example, a keyboard 106, mouse, trackball, microphone, touch screen, a printing device, display screen 107, speaker, etc. In addition, computer system 101 may contain one or more interfaces (e.g., network communication device 108) that connect computer system 101 to a communication network (in addition or as an alternative to the network 110).

The computer system 101 may include one or more storage systems 109. The storage system 109, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 109, as shown, or in memory system 105. The processor 104 generally manipulates the data within the integrated circuit memory 104, and then copies the data to the medium associated with storage 109 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 101 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architectures or components than that shown in FIG. 1.

Specifically, one or more portions of the computer system may be distributed across one or more computer systems coupled to a communications network such as computer systems 103A and 103B. These computer systems also may include general-purpose computer systems and/or may include portable or otherwise specialized computing devices such as cellular telephones, and PDAs. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) 111 using a communication protocol (e.g., TCP/IP).

It should be appreciated that the invention is not limited to executing on any particular system or group of systems. Also, it should be appreciated that the invention is not limited to any particular distributed architecture, network, or communication protocol.

Example System Architecture

Figure 2:
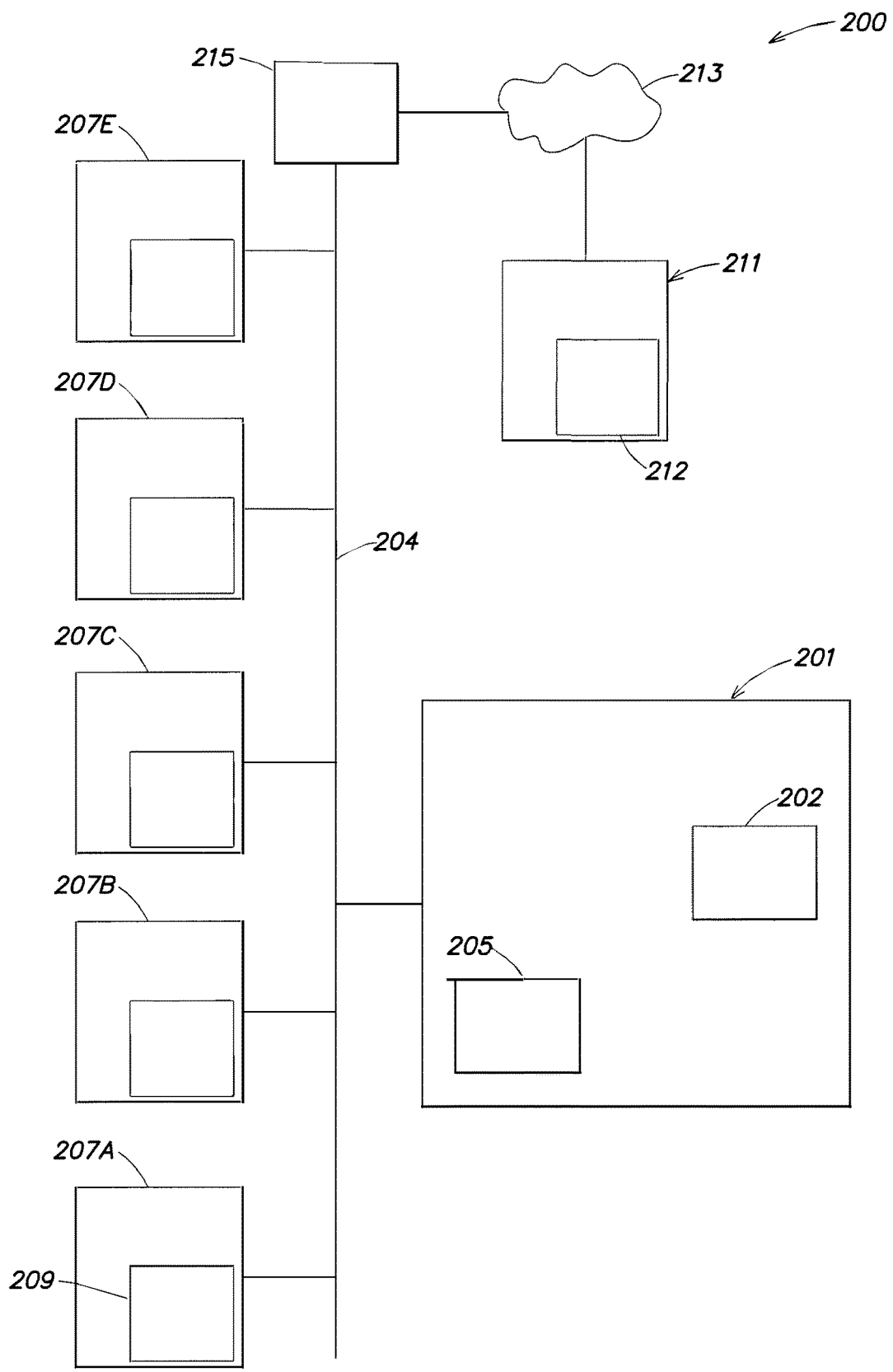
FIG. 2 shows an architecture diagram of an example distributed system according to one embodiment of the invention on which an Internet-based commerce site may be implemented.

FIG. 2 shows an architecture diagram of an example distributed system according to one embodiment of the invention on which an Internet-based commerce site may be implemented. Distributed system 200 may be used to accept, maintain, and transmit and search information regarding bids and requests.

For example, a computer system (e.g., 201, 207A-E) may act as a web server responding to requests from shoppers of an Internet-based commerce site. The web server may communicate with other computer systems (e.g., 201, 207A-E), such as database servers, to obtain information that may be needed to provide responses to the shoppers. It should be appreciated that FIG. 2 is used for example purposes only, and that other architectures may be used to facilitate one or more aspects of the instant invention.

System 200 may include one or more computer systems (e.g., systems 201, 207A-E) coupled by a communication network 204. Such computer systems may include, for example, general-purpose computer systems as discussed above with reference to FIG. 1.

In a system practiced on multiple computer systems, each computer system may be configured to perform a specific function for the system.

For example, in one embodiment of the instant invention, system 201 is a database server that stores bid and request information in one or more databases (e.g., database 202). In one embodiment, a database server may associate bids and requests and store bidder and requester information.

System 201 may include a server process (e.g., process 205) that responds to requests from one or more client programs. Process 205 may include, for example, a structured query language (SQL) server or other server-based process that interfaces to one or more client programs distributed among the other systems (e.g., systems 207A-207E).

In some implementations, other computer systems, in addition to system 201, may also act as database servers. Such computer systems, including system 201, may be configured to execute a well-known database management program such as Microsoft's SQL server software, or an open source database manger such as PostgreSQL database manager. These database servers may be configured to respond to database access and update request from other computer systems. In some implementations, one database server may be configured as a master database server that distributes database requests to other database servers in order to maximize the speed of responding to database requests. In some implementations, the master database server may be configured to respond to database update requests and maintain an updated copy of the database on all other database servers. Each of the other database servers may be configured to respond only to database read or search requests.

Other server based processes being executed by the other computer systems, may include a web server process, an XML server process, peer-to-peer process, a domain name server process, a routing server process, etc. In the case of a web server process 209, the computer system executing the process may be configured to accept incoming hypertext transfer protocol (HTTP) requests from a user of an Internet-based commerce site, for example through a web browser 212 being executed on a remote computer system 211 operated by the user.

Web browser 212 may direct requests through the Internet 213 to an edge routing device 215 associated with an Internet-based commerce site. Edge routing device 215 may direct the request to the web server 207A through the network 204. Web server process 209 may respond to the request by providing the requested information. In some instances, web server process 209 may communicate with other computer systems to respond to the request. For example, web server process 209 may receive a request that requires an SQL database query or other database query. In that instance, web server 207A may convert the received HTTP request into an SQL or other database query for an SQL or other database server. Web server 207A may transmit the SQL or other database request to the SQL or other database server and, after receiving a response from the database server, respond to the initial HTTP request.

According to one embodiment, a program executed by one of the computer systems 207B may be capable of managing bid and request information. In one embodiment, such a program may include any type of application capable of communicating with the other computer systems of the system 200 through network 204 either directly or indirectly.

For example, the client program may provide bid and request information to a database server for storage and/or provide bid and/or request information to a user. The program may determine if requests have expired and/or been fulfilled and remove such requests. The program may determine if a bid has been accepted and process any finalization actions such as fee collection.

According to one embodiment, a program executed by one of the computer systems 207C may be capable of accepting submission of a new request for a product. In one embodiment, such a program may include any type of application capable of communicating with the other computer systems of the system 200 through network 204 either directly or indirectly. For example, the client program may provide a representation of the request to a request/bid management program for creation and/or storage.

According to one embodiment, a program executed by one of the computer systems 207D may be capable of accepting submission of a new bid for a product. In one embodiment, such a program may include any type of application capable of communicating with the other computer systems of the system 200 through network 204 either directly or indirectly. For example, the client program may provide a representation of the bid to a request/bid management program for creation and/or storage.

According to one embodiment, a program executed by one of the computer systems 207E may be capable of enabling conversations between a requester and a bidder. In one embodiment, such a program may include any type of application capable of communicating with the other computer systems of the system 200 through network 204 either directly or indirectly. For example, the client program may determine that a bid has been placed by a bidder for a particular request by a requester either by receiving an indication (e.g., from a request/bid management program) or by querying a database, for example. The conversations program may then transmit a representation of a conversation starting message to an account of the requester. The requester may respond to the conversation starting message by transmitting a conversation message back to the bidder. In some implementations, the requester may transmit such a conversation message through the conversation program. The bidder and requester may then continue to transmit conversation message to each other, in some implementations through the conversation program.

In various embodiments, such computer programs may be implemented on a single computer system or multiple computer systems.

Example Processes and Interfaces

Figure 3:
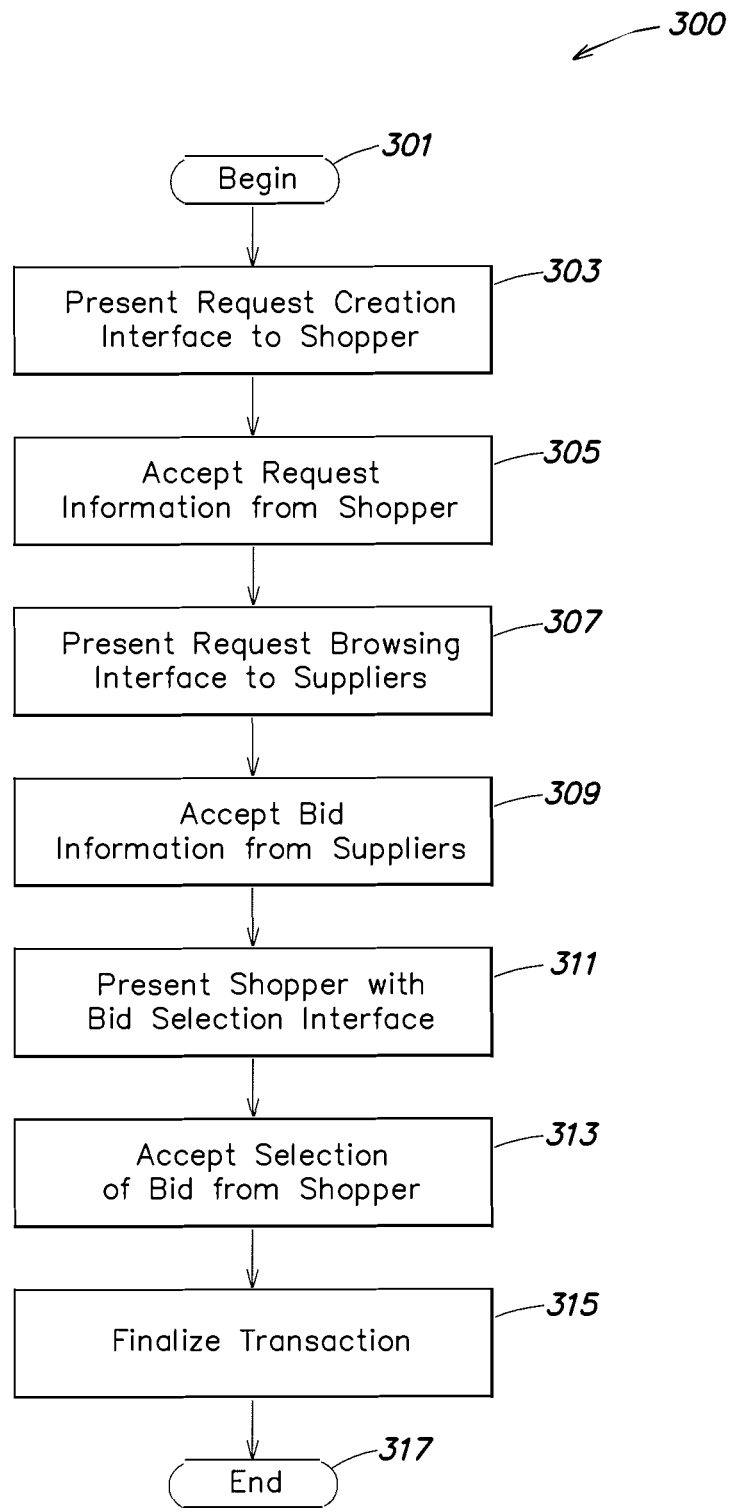
FIG. 3 shows an example process according to one embodiment of the instant invention.

FIG. 3 shows an example process 300 according to one embodiment of the instant invention that begins at block 301. Process 300 or a similar process may be performed by a computing device, such as a general purpose computer 100 described above. Process 300 or a similar process may provide a fast and easy method of providing shoppers with the ability to obtain custom products created based on their own ideas and/or designs. Process 300 or a similar process may be performed to enable a shopper using an Internet-based commerce site to request a custom made product from at least one seller using the Internet-based commerce site. Process 300 or a similar process may be performed to enable sellers using an Internet-based commerce site to bid on custom product creation requests submitted by shoppers using the Internet-base commerce site. Process 300 or a similar process may be performed to enable shoppers using an Internet-based commerce site to choose from a plurality of bids to supply a custom made product that were submitted by sellers using the Internet-based commerce site.

Figure 4:
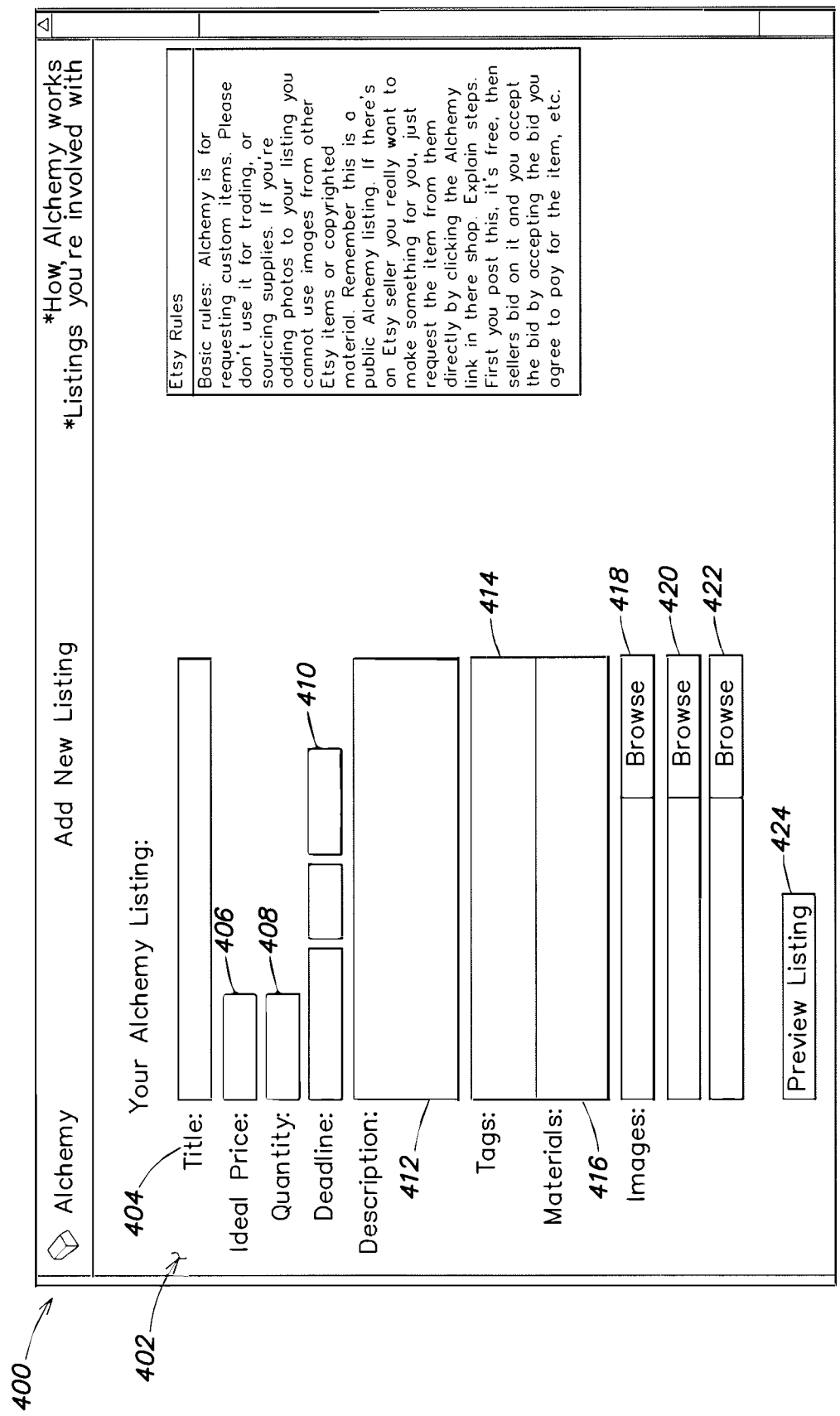
FIG. 4 shows an example request creation interface according to one embodiment of the instant invention.

Process 300 begins at 301, and as indicated at block 303, may include presenting a request creation interface to a shopper. FIG. 4 shows an example request creation interface 400. The request creation interface may include a webpage 402 viewable through a standard web browser. In some implementations, presenting the request creation interface to the shopper may include transmitting an electronic message, such as a hypertext markup language (HTML) document to the shopper.

In some embodiments, through a request creation interface, a shopper may enter information regarding a custom product design and/or idea. In some implementations, such information may include a title 404, a target price 406, a quantity 408, a deadline 410, a description 412, one or more descriptive tags 414, one or more materials 416, and/or one or more images, selectable by the shopper with controls 418-422. In some implementations, tags may be used for searching and/or categorization of requests.

Various aspects of the present invention may be practiced in accordance with the teachings of U.S. provisional patent application No. 60/834,079 to Maguire, et al., entitled "SYSTEM AND METHOD FOR DYNAMIC CATEGORIZATION," and filed on Jul. 28, 2006 incorporated by reference herein. Said application describes in more detail a system and process in accordance with some embodiments of the instant invention, and in particular a system and process that may be used for categorization and searching of requests and/or bids.

When a shopper has finished entering information regarding the custom product, the shopper may submit the information to the Internet-based commerce site. For example, a shopper may submit the information by selecting a submit control of a request creation interface. In some implementations, selecting a submit control may cause a request creation interface, such as a webpage, to transmit an indication of the information to the Internet-based commerce site. In some implementations, the indication may include an electronic message such as a hypertext transfer protocol (HTTP) message.

Figure 5:
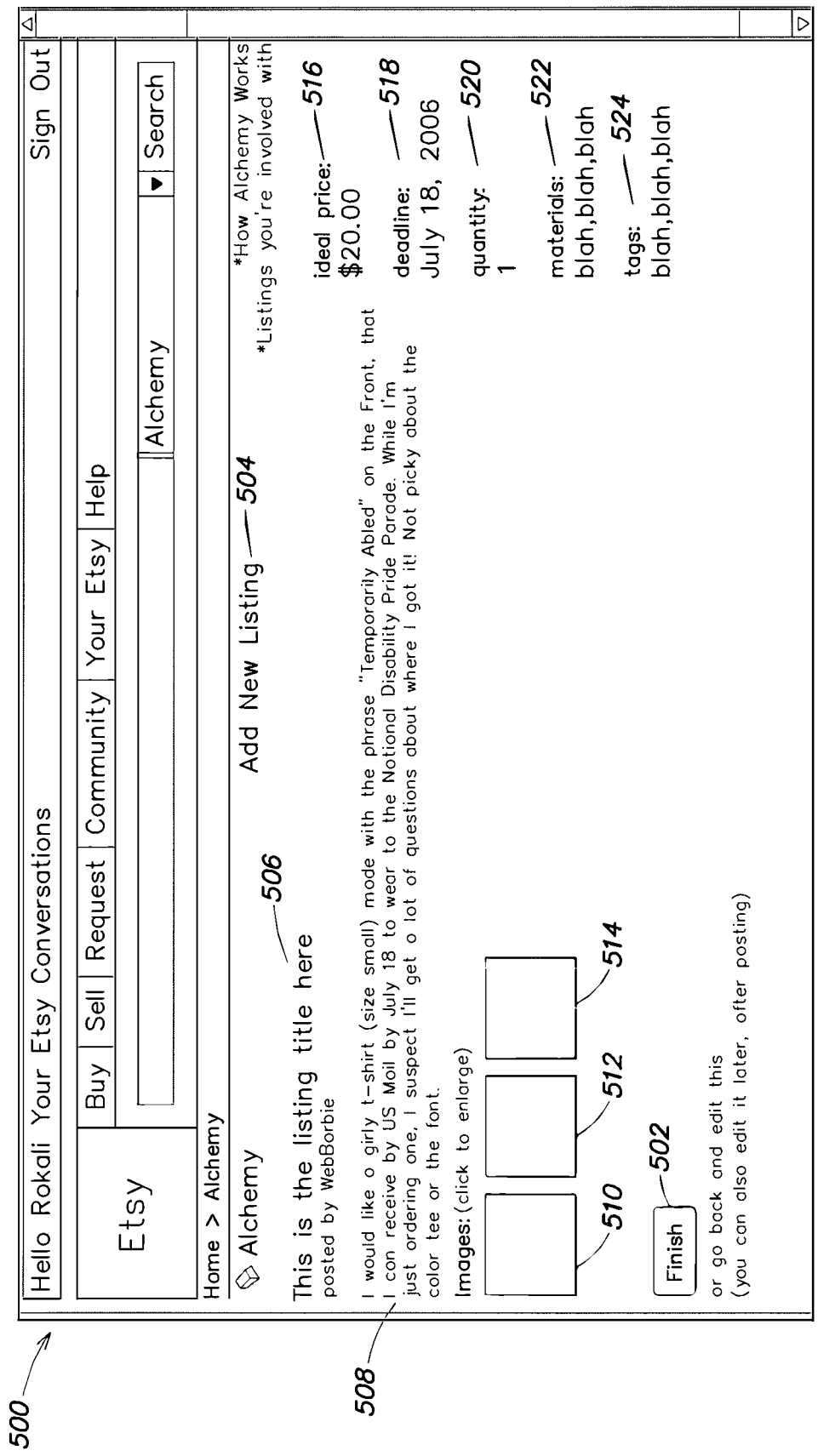
FIG. 5 shows an example preview interface according to one embodiment of the instant invention.

In the example embodiment of FIG. 4, a shopper may preview a request before submitting the request by selecting a preview control 424. FIG. 5 shows an example preview interface 500 that may be present to a shopper after selecting a preview control. A shopper may then submit the request by selecting a finish control 502 such as the one shown in FIG. 5. Interface 500 may also include a control for adding new listings 504, title of listing 506, description 508, and one or more images 510-514. Other information may also be presented, for example, ideal price 516, deadline 518, quantity 520, material 522, and tags 524.

As indicated at block 305 of FIG. 3, process 300 may include accepting information regarding a request for the creation of a custom product from a shopper. Accepting the information may include receiving an electronic message representing the information transmitted from a shopper using a request creation interface, as described above. In some implementations, the information may be received from a communication network, such as the Internet, by a computer device, such as a general purpose computer 100 described above.

In some embodiments, process 300 may include storing at least some information accepted regarding a request for creation of a custom product. The information, for example, may be stored in one or more database tables that may later be queried to access the information.

In some embodiments, requests may expire after a predetermined period of time and may then be removed from database tables or otherwise flagged so that they are not provided to sellers browsing requests, as described below. In some implementations, a shopper may also select to remove or edit a request he or she submitted.

As indicated at block 307 of FIG. 3, process 300 may include presenting a request browsing interface to one or more sellers. FIG. 6 shows an example request browsing interface according to an example embodiment of the instant invention. A request browsing interface 600 may provide the public or an authorized set of sellers with the ability to browse requests submitted by shoppers (e.g., as described above with respect to block 303). In some implementations, the request browsing interface may include a webpage viewable with a standard web browser. The request browsing interface, 600, may include displays of listings arranged by title 602, ideal price 604, date posted 606, deadline 608, number of bids 610, and requestor 612. In one example, the display of the request list 614 may be rearranged by a user by selecting anyone of 602-612. The request list will display sorted by the selected option.

In some embodiments, a request browsing interface may display a representation of a plurality of requests submitted by a plurality of shoppers. In some implementations, the representation of the plurality of requests may include a list of requests. In some implementations, the representation of the plurality of requests may include a summary of the requests that allows a seller to quickly determine whether the seller may desire to bid on the request. In some implementations, the summary and/or any other information (e.g., pictures, titles, etc.) may be retrieved from a database of information storing request related information, as described above.

Figure 7:
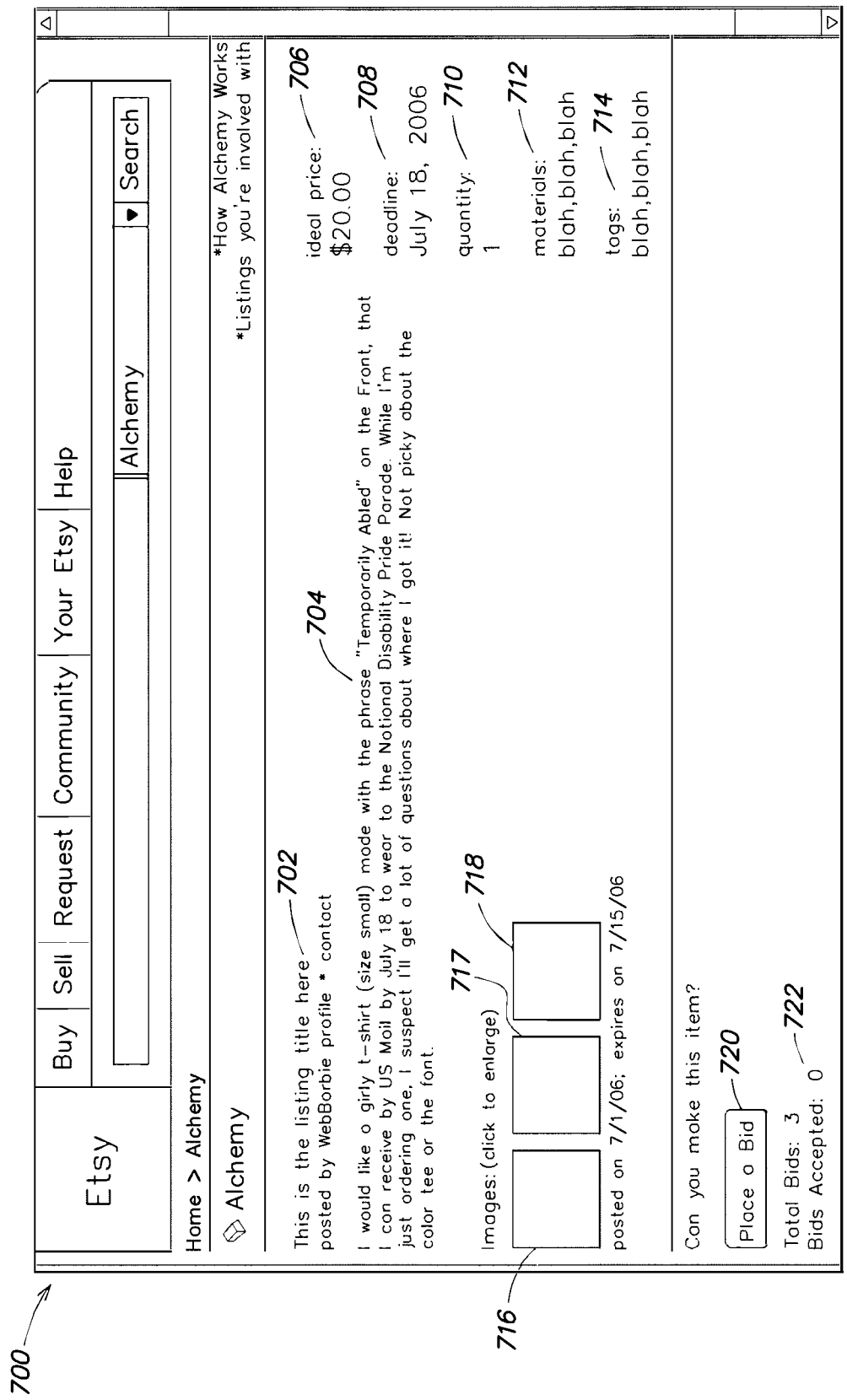
FIG. 7 shows an example specific request interface according to one embodiment of the instant invention.

In some embodiments, a seller may select a control associated with a specific request (e.g., click on an image, button, or link) to access a more detailed set of information related to a specific request. In some implementations, for example, selecting such a control may provide access to a specific request interface 700 displaying some or all of the information entered by the shopper originating the request (as described above—for example, title 702, description 704, ideal price 706, deadline 708, quantity 710, materials 712, tags 714). One or more images 716-718 may also be included. One example specific request interface is shown in FIG. 7. In some implementations, a specific request interface may notify a seller if a request is still valid (e.g., not expired, removed, or fulfilled). In one embodiment, request interface 700 contains a control 720 that permits a user to submit a bid. Display 722 indicates a number of total bids and the number of bids accepted.

In some implementations, a seller may access a bid submission interface to submit a bid for one or more requests of the plurality of requests listed with the Internet-based commerce site. In some implementations, for example, the seller may access such a bid submission interface by selecting a bid control in a request browsing interface or a specific request interface.

Figure 8:
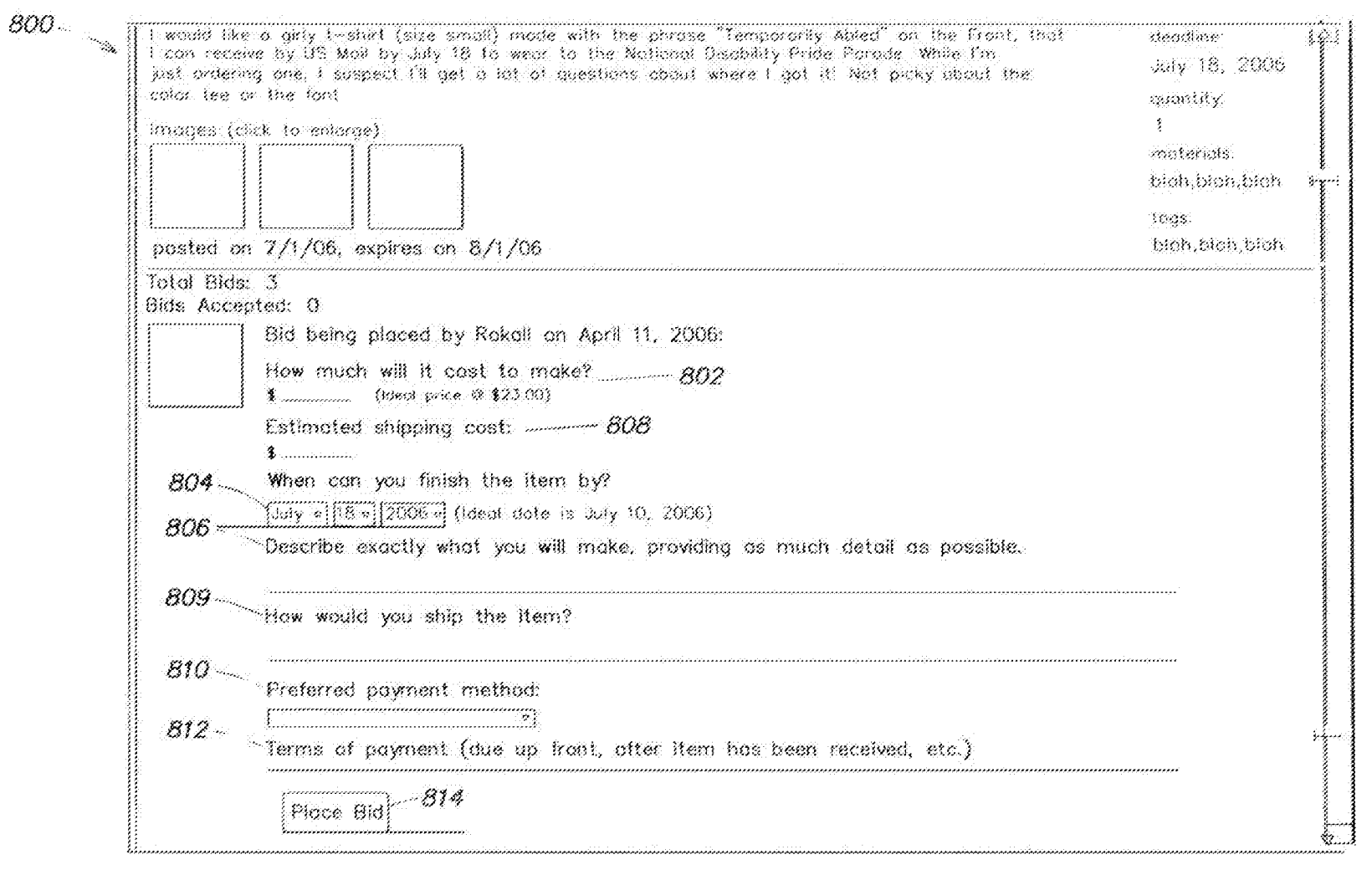

In some embodiments, a seller may enter information regarding a bid through a bid submission interface 800. FIG. 8 shows an example bid submission interface. The information may include a cost 802, a delivery target date 804, a product description 806, shipping details (e.g., cost 808 and how shipped 809), payment details (e.g., preferred method 810, payment terms 812) and/or any other desired information.

In some embodiments, a seller may submit a bid by selecting a place bid control 814 of a bid submission interface. The bid submission interface, similar the request submission interface described above, may transmit a representation of a bid to a computer device (e.g., a general purpose computer system 100 as described above). In some implementations, a seller may be asked to confirm a bid before a bid is submitted.

As indicated in block 309, process 300 may include accepting information regarding a bid from one or more sellers. Accepting the information may include receiving an electronic message representing the bid from the seller. The information may include an indication of a request corresponding to the bid (e.g., a request ID number, a request name, etc). The indication may allow a computer system to determine an associated request stored in one or more database tables.

In some embodiments, process 300 may include storing the information regarding the bid in one or more database tables. The bid information stored in the database tables may be associated with a request. The bid information stored in the database tables may be searchable so that all bids associated with/submitted for a particular request may be determined from the database table.

In some embodiments, a seller may later view details of a bid through a bid status interface. One example bid status interface 900 is shown in FIG. 9. In some implementations, the bid status interface may provide the seller with an update as to whether the bid has been accepted or whether the request has been otherwise fulfilled or canceled. In one embodiment, status is displayed by showing one of current status displays 901-903. Additionally, a user may select status display 901-903 to learn additional information.

In some embodiments, a seller may also edit a previously submitted bid. FIG. 10, for example, shows a bid editing interface 1000 that may be used in some implementations. A seller, for example, may change information regarding the bid (cost 1004, shipping cost 1006, finish date 1008, description 1010, shipping method 1012, preferred payment method 1014, payment terms 1016) and submit the changed information by selecting a save changes control 1002. Such a process may be substantially similar to an original submission of a bid.

In some implementations, each bid submitted by a seller for a particular request may be kept confidential between the seller submitting the bid and shopper originating the request.

As indicated at block 311, process 300 may include presenting the shopper with a bid selection interface. FIG. 11 shows an example bid selection interface 1100. A bid selection interface may provide a shopper that has submitted a request with information concerning any bids that have been submitted for the request. In some implementations, a bid selection interface may also provide the seller with a status of the request (e.g., expired so no new bids will be incoming, active so more bids may be incoming, fulfilled, etc.) and a control 1102 for accepting bids.

In some embodiments, the bid selection interface may provide a representation of the bids to the seller. In some embodiments, the bid selection interface may allow a shopper to view information regarding the sellers associated with the bids (e.g., name, location, reviews, prior work).

In some embodiments, the bid selection interface may enable a shopper to begin a conversation with one or more sellers that have submitted bids for a request. Such conversations may enable a shopper and a seller to negotiate a final agreement and discuss details before a final agreement is reached between the shopper and the seller.

In some embodiments, such conversations may take place through email, instant messaging, telephone, or any other communication medium. In one example implementation, the conversation may occur through a messaging system associated with the Internet-based commerce site. The messaging system may enable the shopper and seller to transmit email or other messages to accounts maintained by the Internet-based commerce site or accounts listed with the Internet-based commerce site. For example, a shopper may select a conversation control to access a message interface through which the shopper may enter a message for the seller. The shopper may select a send control to transmit the message to an account maintained by the Internet based commerce site or to an email account that has been listed with the Internet-based commerce site and associated with the seller. The seller then may respond in like fashion to such a received message.

In some implementations, conversions between a shopper and a seller may be recorded in one or more database tables. Such recording may be useful for review later, such as if a dispute between the seller and the shopper arises in the future regarding a particular transaction.

In some embodiments, a shopper that submitted a request may select a bid from among a plurality of bids submitted for that request. In some embodiments, the seller may make such a selection through the bid selection interface (e.g., by selecting a bid selection control). In some implementations, selecting a bid through the bid selection interface may cause an electronic message to be transmitted to a computing device (e.g., a general purpose computer 100 as described above). The electronic message may include an indication of the selected bid (e.g., an ID number associated with the bid). In some embodiments, a shopper may be asked to confirm a bid selection before selection is completed.

In some embodiments, a shopper may select multiple bids. For example, if a shopper desires multiple items and no single seller bids to supply the desired number, the shopper may select multiple sellers to fulfill the request. In some implementations, when a shopper selects a bid, the shopper may be asked if the request should stay open so that future bids may be accepted, and/or if the shopper wants to accept additional bids. In some implementations, if the shopper does not indicate that the request should stay open after accepting a bid, the request may be removed and/or flagged as fulfilled in a database table.

As indicated at block 313, process 300 may include accepting a selection of a bid from a shopper. Accepting the selection of the bid may include receiving an electronic message representing a selection of the bid from the shopper. In some implementations, process 300 may include storing information regarding the selection of the bid in one or more database tables.

In some embodiments, after bid information has been accepted, a shopper may access updated status information for a request through a status interface. An example status interface 1200 is shown in FIG. 12. As shown, a shopper may view bids that have been accepted 1202-1204 for the request through the status interface.

In some implementations, after a bid has been accepted, a seller may be notified and asked to confirm a bid before a transaction is finalized. In some implementations, the seller may be notified through an email message sent to an account managed by the Internet-based commerce site, and/or a remote account listed with the Internet-based commerce site.

As indicated at block 315, process 300 may include finalizing a transaction between a seller and a shopper. Finalization may include, for example, removing information from a database table, or otherwise flagging that information, requesting feedback from the seller and/or shopper, verifying that the transaction has been completed as desired, allocation/collection/distribution of fees or payments. In some implementations, for example, a payment may be collected from a shopper by the Internet based commerce site (e.g., before the completion of the product or after the completion of the product depending on the deal reached between the seller and shopper and the configuration of the Internet based commerce site). In some implementations the Internet-based commerce site may then collect a percentage of the payment as a fee for the listing services provided and then distribute the remaining payment to the seller (e.g., to a money account such as a bank account or money transfer account such as a Paypal.com account).

In other implementations, the seller and shopper may provide payment to each other without the Internet-based commerce site as an intermediary. In such implementations, the Internet-based commerce site may bill the seller a fee (e.g., a percentage of the payment, a flat fee). The internet-based commerce site, for example, may charge an account of the seller, such as a bank account, credit card account, or money transferor account. Charging the seller may encourage shoppers to submit more requests and provide a feeling that the service is provided for free. However, in other implementations, a shopper may be charged for listing a request.

In some implementations, feedback may be accepted from the shopper and or seller about the respective other party. In some implementations, such feedback may be given greater weight compared to feedback regarding standard sales transactions.

In some embodiments, during and after the creation of a custom product, a seller may submit progress updates to the seller through the Internet-based commerce site. Such progress updates, for example, may include descriptions and/or pictures of a custom product being fabricated and/or after the fabrication. FIG. 13 shows one example progress update interface 1300 through which a seller may submit a progress update 1302 to a shopper through the Internet-based commerce site.

In some implementations, a seller may submit an electronic message including a representation of the progress update to the Internet-based commerce site by selecting a submit control of a progress update interface. In some implementations, after receiving a representation of a progress update, the Internet-based commerce site may allow the associated shopper to view the progress update. For example, the Internet-based commerce site may email the progress update to the shopper or allow the shopper to access the progress update through an update interface (not shown).

In some embodiments of the instant invention, in addition to or as an alternative to public requests for a custom product, a shopper may submit a private request to a specific seller. For example, if a shopper and seller have had favorable dealings in the past, a shopper may decide to submit a request directly to that seller only. The seller may receive the request through a private request interface, or an email interface and place bids similar to the above described public request process. In some implementations, a shopper may select multiple sellers to submit a private request to rather than a single seller. Process 300 ends at step 317.

Figure 14:
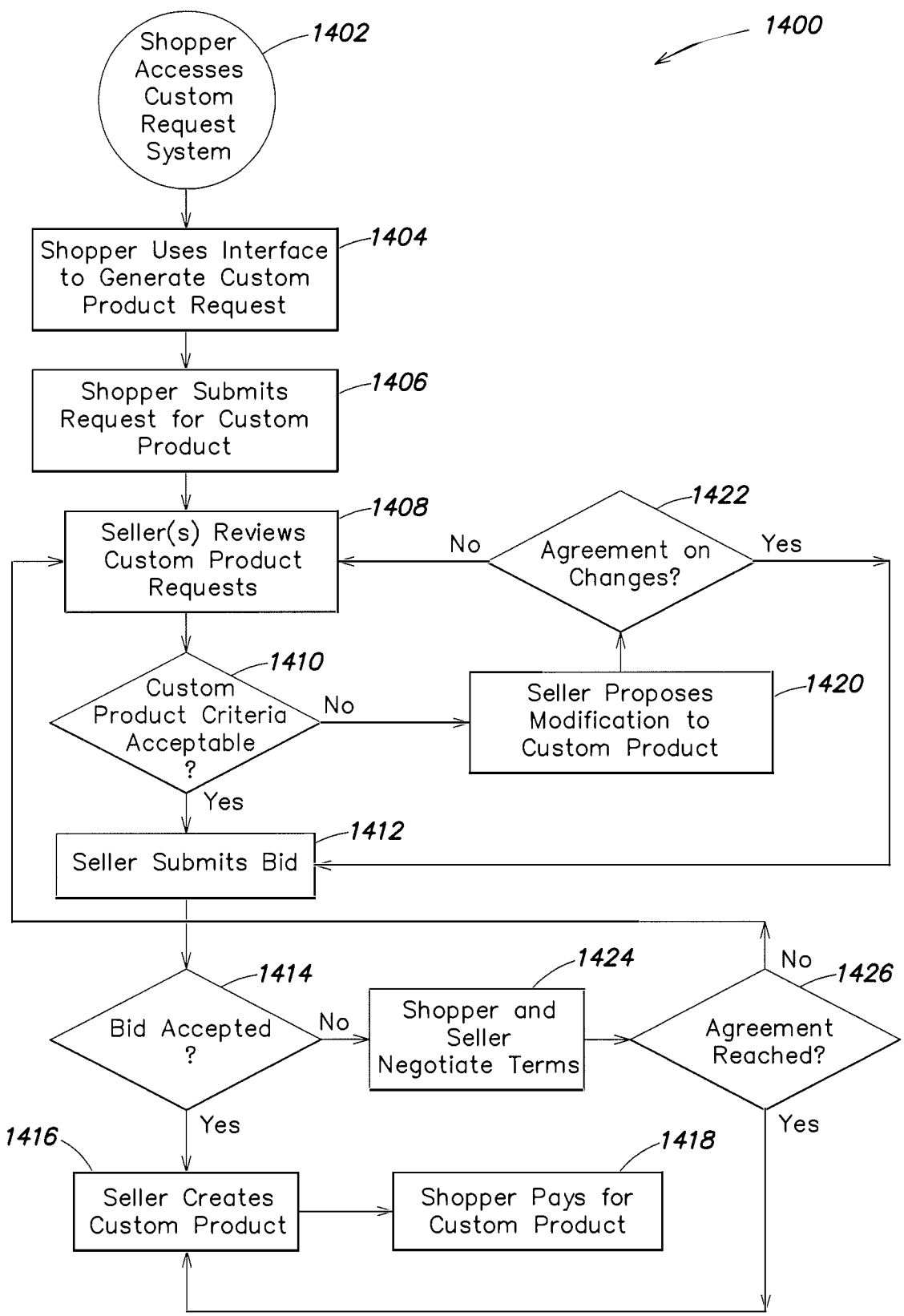
FIG. 14 shows an example process according to one embodiment of the instant invention.

FIG. 14 shows an example process 1400 according to one embodiment of the instant invention. Process 1400 or a similar process may be performed by a computing device, such as a general purpose computer 100 described above. Process 1400 or a similar process may provide a fast and easy method of providing shoppers with the ability to obtain custom products created based on their own ideas and/or designs. Process 1400 or a similar process may be performed to enable a shopper using an Internet-based commerce site to request a custom made product from at least one seller using the Internet-based commerce site. Process 1400 or a similar process may be performed to enable sellers using an Internet-based commerce site to bid on custom product creation requests submitted by shoppers using the Internet-base commerce site. Process 1400 or a similar process may be performed to enable shoppers using an Internet-based commerce site to choose from a plurality of bids to supply a custom made product that were submitted by sellers using the Internet-based commerce site.

A shopper accesses a custom request system at 1402. In one embodiment, the shopper is provided access through a web based interface. In one embodiment the shopper uses the interface to generate a custom product request 1406. The custom product request may include various options, for example, ideal price, deadline for receipt, material, images of desired end product, method of shipment, terms for payment, among other options. The custom product request is submitted at 1406. Seller(s) review custom product requests at 1408. In one embodiment, a seller uses a request browsing interface, as described above with respect to FIG. 6. If the seller is interested in fulfilling the custom product request, the seller reviews the request criteria and determines if the criteria are acceptable at 1410. If the request criteria are acceptable 1410 (Yes), the seller submits a bid at 1412.

If the submitted bid is acceptable to the shopper the bid is accepted at 1414 (Yes). Once a bid has been accepted the seller fulfills the request at 1416 according to the terms of the request. In one embodiment, the terms of the request include payment options, which require the shopper to pay for the custom product at 1418 upon delivery. Other payment options may also be used. One alternative includes payment of half the price to begin manufacture, and complete payment upon delivery, although other options may also be used (full payment up front, for example).

Process 1400 also provides for negotiation between a shopper and a seller. If the criteria for a custom product request are not acceptable 1410 (No) but would be acceptable to a potential seller if certain modification where made to for example, price, material, and/or deadline, a seller may propose alternative criteria at 1420. If agreement between the shopper and seller is reached 1422 (Yes), a seller submits a bid for fulfilling the request under the new terms at 1412. If agreement can not be reached 1422 (No), the shopper waits for different sellers to review the custom product request 1408. Additionally, the seller may still bid on the custom product request even if agreement on new terms is not reached. Additional negotiation between a shopper and a seller may also occur after a bid is submitted. If the shopper does not accept a bid at 1414 (No), the shopper and seller may optionally engage in negotiations 1424 to obtain agreement 1426 (Yes). Shopper and Seller may vary the criteria for the custom product request so that the criteria are accepted to both parties. If agreement is reached 1426 (Yes), the seller creates the custom product at 1416, and the shopper pays at 1418. If the negotiation does not result in agreement 1426 (No) the shopper waits for different sellers to review the custom product request 1408. Additionally, the seller may still continue to bid on the custom product request even if the negotiation did not result in agreement.

It should be understood that although various aspects of the instant invention have been described with respect to general purpose computers and/or wired communication networks that the instant invention is not so limited. Rather, various embodiments of the instant invention may include processes performed by and/or communication with wireless networks and/or mobile and/or specialized computing devices. For example, in some implementations, a shopper may access an Internet-based commerce site using a cellular telephone. The Internet-based commerce site may provide information to the cellular telephone through a cellular network using SMS, MMS, HTML or other messages.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of facilitating communication between users, comprising:
    accepting, by one or more computers, a first electronic message including an item request from a first user;
    processing, by the one or more computers, the item request, including:
        generating summary data that summarizes information included in the item request; and
        storing the generated summary data and the information included in the item request in a database;
    receiving, from one or more other users, a browsing request;
    in response to receiving the browsing request:
        accessing, by the one or more computers, the database to retrieve the generated summary data for the item request;
        generating, by the one or more computers, a browsing interface that presents the generated summary data for the item request retrieved from the database; and
        providing the generated browsing interface to a client device of the one or more other users;
    receiving, by the one or more computers, a specific request for more information about the item request that is generated by interaction, by the one or more other users, with a control corresponding to the generated summary data that is presented in the browsing interface;
    responding, by the one or more computers, to the specific request with a specific request interface that presents additional information about the item request obtained from the database;
    accepting, by the one or more computers, a second electronic message about the item request that is submitted through a communication field presented at the client device of a given user among the one or more other users; and
    in response to accepting the second electronic message about the item request, establishing a private message exchange between the given user and the first user that enables the given user and the first user to exchange private messages.

2. The method of claim 1, comprising:
    obtaining an indication that the given user has agreed to fulfill the item request of the first user;
    providing, to each of the first user and the given user, a status interface that tracks a status of the item request;
    receiving, through the status interface, a progress update from the given user; and updating the status interface to communicate the progress update to the first user.

3. The method of claim 1, comprising:
determining that a specified amount of time has passed since the first request was accepted; and
preventing further distribution of information about the first request in response to browsing requests from the other users.

4. The method of claim 1, wherein responding to the specific request with a specific request interface that presents additional information about the item request comprises responding to the specific request with information specifying whether the item request is still valid.

5. The method of claim 1, wherein:
processing the item request further comprises categorizing the item request based on the information included in the item request;
receiving a browsing request comprises receiving a query; and
accessing the database to retrieve the generated summary data comprises identifying the item request based on a search of the database using the query.

6. The method of claim 5, wherein identifying the item request based on a search of the database using the query comprises identifying, in the database, a tag corresponding to a category of the item request using the query.

7. The method of claim 1, further comprising:
providing, to the given user, a communications interface that presents information about the item request and includes a text entry field;
receiving, through the text entry field, input from the given user; and
providing the input from the given user to the first user.

8. A system, comprising:
a memory device storing executable instructions; and
one or more processors that interact with the memory device and execute the instructions, wherein execution of the instructions cause the one or more processors to facilitate communication between users by performing operations, comprising:
accepting a first electronic message including an item request from a first user;
processing the item request, including:
generating summary data that summarizes information included in the item request; and
storing the generated summary data and the information included in the item request in a database;
receiving, from one or more other users, a browsing request;
in response to receiving the browsing request:
accessing the database to retrieve the generated summary data for the item request;
generating a browsing interface that presents the generated summary data for the item request retrieved from the database; and
providing the generated browsing interface to a client device of the one or more other users;
receiving a specific request for more information about the item request that is generated by interaction, by the one or more other users, with a control corresponding to the generated summary data that is presented in the browsing interface;
responding to the specific request with a specific request interface that presents additional information about the item request obtained from the database;
accepting a second electronic message about the item request that is submitted through a communication field presented at the client device of a given user among the one or more other users; and
in response to accepting the second electronic message about the item request, establishing a private message exchange between the given user and the first user that enables the given user and the first user to exchange private messages.

9. The system of claim 8, wherein the instructions cause the one or more processors to perform operations comprising:
obtaining an indication that the given user has agreed to fulfill the item request of the first user;
providing, to each of the first user and the given user, a status interface that tracks a status of the item request;
receiving, through the status interface, a progress update from the given user; and
updating the status interface to communicate the progress update to the first user.

10. The system of claim 8, wherein the instructions cause the one or more processors to perform operations comprising:
determining that a specified amount of time has passed since the first request was accepted; and
preventing further distribution of information about the first request in response to browsing requests from the other users.

11. The system of claim 8, wherein responding to the specific request with a specific request interface that presents additional information about the item request comprises responding to the specific request with information specifying whether the item request is still valid.

12. The system of claim 8, wherein:
processing the item request further comprises categorizing the item request based on the information included in the item request;
receiving a browsing request comprises receiving a query; and
accessing the database to retrieve the generated summary data comprises identifying the item request based on a search of the database using the query.

13. The system of claim 12, wherein identifying the item request based on a search of the database using the query comprises identifying, in the database, a tag corresponding to a category of the item request using the query.

14. The system of claim 8, wherein the instructions cause the one or more processors to perform operations comprising:
providing, to the given user, a communications interface that presents information about the item request and includes a text entry field;
receiving, through the text entry field, input from the given user; and
providing the input from the given user to the first user.

15. A non-transitory computer readable medium storing instructions that, upon execution by one or more data processing apparatus, cause the one or more data processing apparatus to perform operations comprising:
a memory device storing executable instructions; and
one or more processors that interact with the memory device and execute the instructions, wherein execution of the instructions cause the one or more processors to facilitate communication between users by performing operations, comprising:
accepting a first electronic message including an item request from a first user;

processing the item request, including:
- generating summary data that summarizes information included in the item request; and
- storing the generated summary data and the information included in the item request in a database;

receiving, from one or more other users, a browsing request;

in response to receiving the browsing request:
- accessing the database to retrieve the generated summary data for the item request;
- generating a browsing interface that presents the generated summary data for the item request retrieved from the database; and
- providing the generated browsing interface to a client device of the one or more other users;

receiving a specific request for more information about the item request that is generated by interaction, by the one or more other users, with a control corresponding to the generated summary data that is presented in the browsing interface;

responding to the specific request with a specific request interface that presents additional information about the item request obtained from the database;

accepting a second electronic message about the item request that is submitted through a communication field presented at the client device of a given user among the one or more other users; and in response to accepting the second electronic message about the item request, establishing a private message exchange between the given user and the first user that enables the given user and the first user to exchange private messages.

16. The non-transitory computer readable medium of claim 15, wherein the instructions cause the one or more processors to perform operations comprising:
- obtaining an indication that the given user has agreed to fulfill the item request of the first user;
- providing, to each of the first user and the given user, a status interface that tracks a status of the item request;
- receiving, through the status interface, a progress update from the given user; and
- updating the status interface to communicate the progress update to the first user.

17. The non-transitory computer readable medium of claim 15, wherein the instructions cause the one or more processors to perform operations comprising:
- determining that a specified amount of time has passed since the first request was accepted; and
- preventing further distribution of information about the first request in response to browsing requests from the other users.

18. The non-transitory computer readable medium of claim 15, wherein responding to the specific request with a specific request interface that presents additional information about the item request comprises responding to the specific request with information specifying whether the item request is still valid.

19. The non-transitory computer readable medium of claim 15, wherein:
- processing the item request further comprises categorizing the item request based on the information included in the item request;
- receiving a browsing request comprises receiving a query; and
- accessing the database to retrieve the generated summary data comprises identifying the item request based on a search of the database using the query.

20. The non-transitory computer readable medium of claim 19, wherein identifying the item request based on a search of the database using the query comprises identifying, in the database, a tag corresponding to a category of the item request using the query.

* * * * *